Jan. 27, 1942.  H. TRECKMANN ET AL  2,271,050
WINDING FRAME
Original Filed Aug. 16, 1939  2 Sheets-Sheet 2
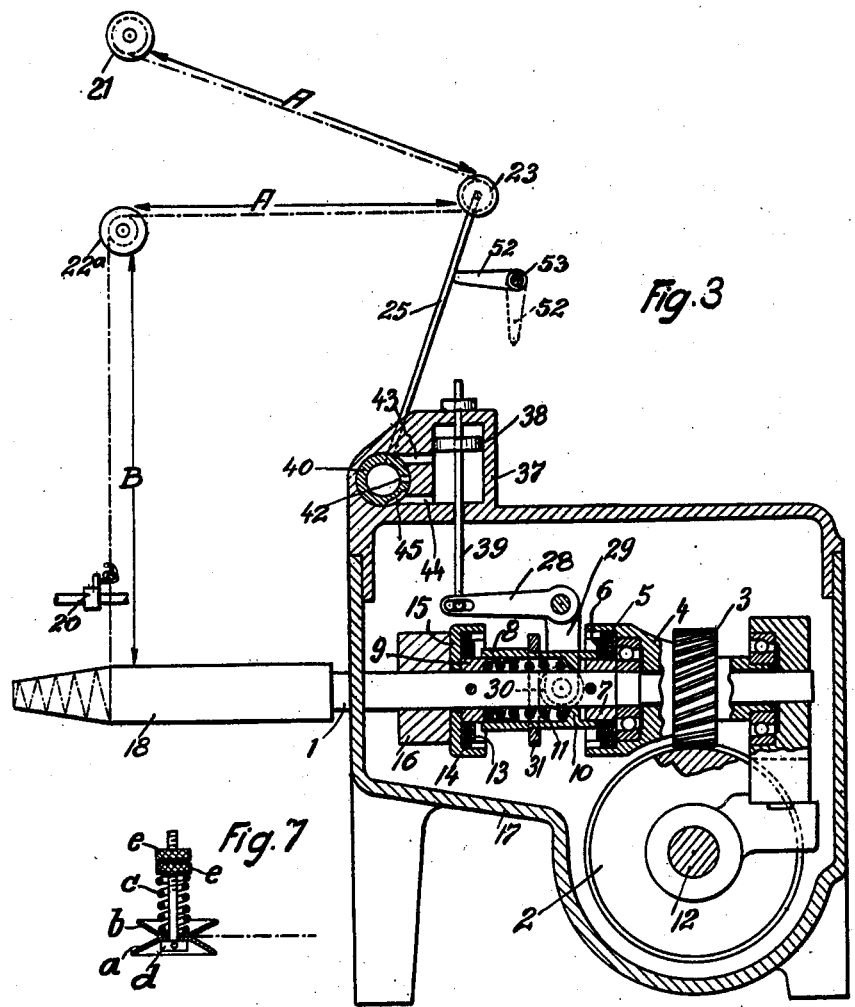
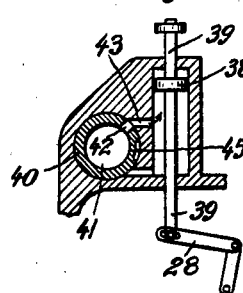
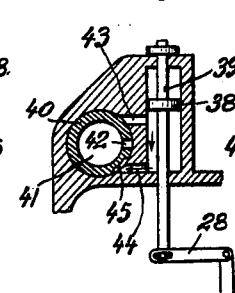
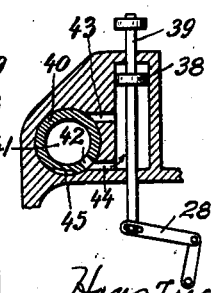

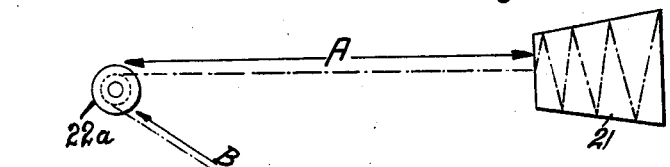
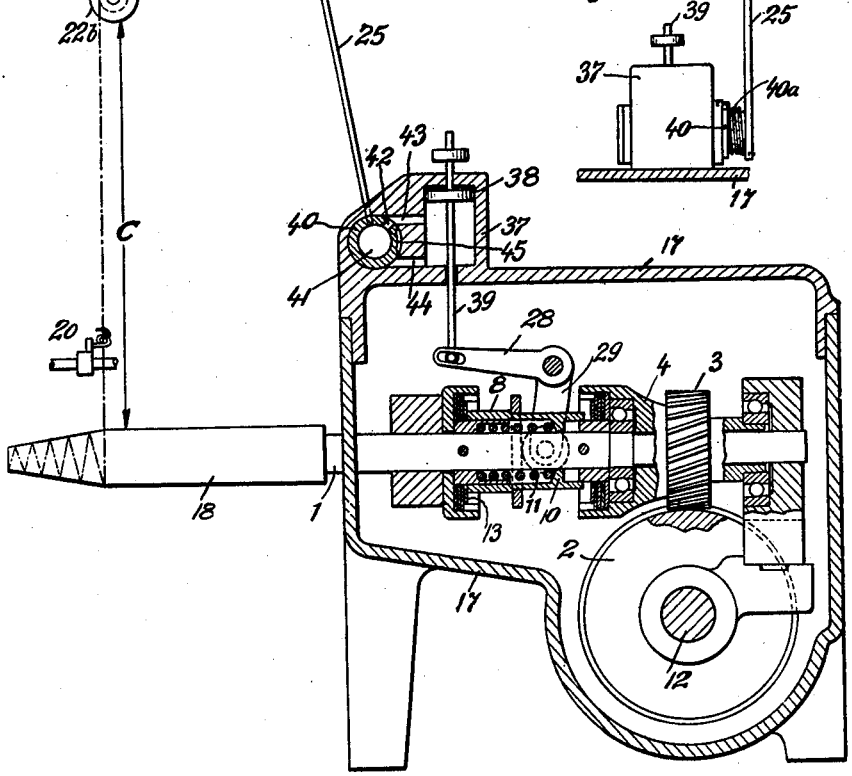

Patented Jan. 27, 1942

2,271,050

UNITED STATES PATENT OFFICE 2,271,050

WINDING FRAME

Hans Treckmann, Wuppertal-Oberbarmen, and Carl-Georg Rosenkranz, Wuppertal-Barmen, Germany, assignors to Messrs. Halstenbach & Co., Wuppertal-Wichlinghausen, Germany, a German partnership company Original application August 16, 1939, Serial No. 290,482. Divided and this application October 5, 1940, Serial No. 359,958. In Germany August 19, 1938

6 Claims. (Cl. 242—45)

This application is a division of our pending application Serial No. 290,482, filed August 16, 1939.

This invention relates to winding frames and has relation more particularly to a power transmitting device for winding a strand of yarn or the like upon a pirn.

It is an object of the invention to provide a mechanism having a driven element or winding spindle in driven connection with a driving member, said driven connection including a clutch element and which mechanism also has a braking element for the driven member or spindle together with means whereby both the clutching element and the braking element are controlled by the tension of a strand, such as yarn, through the medium of a common shifting element, such as a pendulating yarn feeler.

It is also an object of the invention to provide a mechanism of this kind including a clutch element and a braking element for a driven member or spindle under control of a common shifting element and wherein controlled fluid pressure means is provided to move the shifting member in a direction to allow the clutch element to become ineffective and to make the braking element effective.

An additional object of the invention is to provide a mechanism of this kind including a clutch element and a braking element having a shiftable regulating member associated therewith, together with means operated by a liquid or gaseous pressure agent controlled by a yarn feeler or its equivalent for shifting the regulating member whereby is permitted an extremely sensitive and instantaneously acting interruption of the driving means for the driven member or spindle with increased braking action.

The invention consists in the details of construction and in the combination and arrangement of the several parts of our improved winding frame whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein—

Figure 1 is a view partly in section and partly in elevation and of somewhat a diagrammatic character illustrating a power transmitting mechanism constructed in accordance with an embodiment of our invention;

Figure 2 is a fragmentary view partly in elevation and partly in section illustrating the connection of the valve with the yarn feeler as herein comprised;

Figure 3 is a view similar to Figure 1 but illustrating an embodiment of the invention wherein the yarn or strand is drawn tangentially from a rotatively mounted supply bobbin;

Figures 4, 5 and 6 are detailed views partly in section and partly in elevation showing different positions of the rotary valve and the angle lever as herein comprised;

Figure 7 is a fragmentary sectional view of a braking device as herein comprised.

As illustrated in the accompanying drawings, the spindle 1 receives its motion from a gear 3 by way of a worm gear 2, the said gear being mounted firmly on a sleeve 4 which is supported at both ends by ball bearings. The tubular cavity in the one end of the sleeve 4 carries axially movable discs 5 co-operating with corresponding discs 6, which are connected so as to be axially shiftable to a collar 7 mounted on the spindle 1, and are acted upon by a shifting member 8, which is designed as a sleeve and is guided at the one end on the collar 7.

The opposite end of this shifting member 8 is supported in axially slidable fashion by a second collar 9, which is also mounted on the spindle 1. An inner rib 10 in the sleeve 8 is acted upon by a coil spring 11, which bears against the collar 9 and by reason of its shifting effect on the sleeve 8 has the tendency to maintain the discs 6 and 5 of the driving clutch in engagement with one another, so that in this case the driving force emanating from the worm wheel 2 on the shaft 12 is transmitted by way of the gear 3, the sleeve 4 and the discs 5 and 6 to the collar 7 firmly mounted on the spindle 1.

If the member 8 is moved in opposition to the spring 11, the clutch discs 5 and 6 are released from engagement and the drive ceases to act on the spindle 1. If the member 8 is moved still further, it enters into engagement with the discs 13 and 14, of which the former are mounted to be axially slidable on the collar 9, whilst the latter are arranged to slide axially in a fixed brake drum 15, which is firmly connected to the bearing 16 for the casing 17 of the gear box, which latter is mounted in the frame of the winding machine.

Fig. 1 shows on the spindle 1 a pirn 18, which is produced by guiding the yarn 19 in the conventional fashion by means of a traversing yarn guide 20. The yarn 19 comes from a supply bobbin 21, from which, in the embodiment according to Fig. 1, it is withdrawn endwise, i. e., axially, whereupon it passes through a braking device 22a, over the roller 23 of a feeler lever 25 pivotally mounted at 24 and to a second braking device 22b and thence through the eyelet of the traversing yarn guide 20. The two braking devices 22a and 22b consist in the conventional manner of two oppositely disposed plates a and b, which are subjected to a regulable pressure by means of a threaded bolt d, two adjustment nuts e, e and a coil spring c. They are so adapted to one another that the tension necessary for the winding of the yarn on the pirn 18 is imparted to the yarn by the braking device 22b, whilst the braking device 22a tensions the yarn proceeding from the bobbin 21 to the braking device 22b to a smaller extent.

With this disposal of the two braking devices 22a and 22b there are accordingly produced in the yarn between the bobbin 21 and the pirn 18 three tension ranges as follows: the tension range A along the path between the bobbin 21 and the braking device 22a, the tension range B, which extends from the braking device 22a over the roller 23 of the feeler lever 25 to the braking device 22b, and the tension range C, in which tension is applied to the yarn 19 by the braking device 22b before it is wound on the pirn 18.

As shown by Fig. 1, the yarn feeler lever 25 is disposed in the tension range B, in which the tension is less than in the range C, in which there prevails the working tension.

Interposed between the arm feeler 25 and the angle lever 28 of the shifting member 8 is a compressed air cylinder 37 having a piston 38, the rod 39 of which slides in fixed bearings and engages by means of a stud in a slot in the angle lever 28. With the interior of the cylinder 37 there co-operates a rotary slide valve 40, which carries the feeler lever 25 in direct fashion and is controlled by the pendulation of the said lever. The lever 25 is acted upon by a coil spring 40a (Fig. 2), which is adapted to the effect of the braking device 22a and determines the angular resistance of the lever 25, which resistance upon the rocking of the lever 25 requires to be overcome by the increasing tension of the yarn in the tension range B. The interior 41 of the rotary slide 40 is in communication with compressed air or a liquid under pressure and possesses a port 42, which in its extreme positions co-operates with passages 43 and 44 leading to the cylinder 37. In addition there is also provided in the rotary slide valve 40 a recess 45, which in the axial direction communicates with the atmosphere (Fig. 2) and by means of which the pressure created in the cylinder 37 by the pressure agent can again be exhausted. In all cases in which the feeler lever 25 is not directly acted upon by the spring 11 of the shifting member 8 there is provided for the same the spring 40a (Fig. 2), which is adapted to the braking device 22a.

The three positions capable of being obtained with this rotary slide valve are illustrated in Figs. 4, 5 and 6. In the position in Fig. 5, which corresponds to the position of the feeler in Fig. 3, the slide valve 40 is ineffective, and the lower side of the piston 38 communicates with the atmosphere by way of the recess 45. There is accordingly no action on the shifting member 8 for the two groups of discs. If the tension of the yarn increases, so that the lever 25 is moved into the position shown in Fig. 4, the port 42 is thus placed in communication with the passage 43 and allows the pressure agent to flow underneath the piston 38, which by way of the piston rod 39 actuates the bell crank lever 28, the shifting member 8 thereupon moving the discs of the driving clutch out of engagement and the discs of the braking clutch into engagement with one another. By suitable dimensioning of the port 42 in relation to the passage 43 there can be obtained either a gradual or an abrupt action on the piston 38. If the tension of the yarn decreases and in consequence the feeler lever 25 is again returned into its position according to Fig. 3, the rotary slide valve 40 will again be moved into the position according to Fig. 5. If the tension of the yarn ceases entirely, for example when the supply bobbin is exhausted or for other reasons, the lever 25 follows the pull of the spring 40a, and the rotary slide valve 40 is then moved into the position in Fig. 6, in which the port 42 communicates with the passage 44, through which the pressure agent is also admitted and lifts the piston 38 into the position according to Fig. 4, disconnecting the drive and stopping the spindle by way of the braking discs. When the lever 25 is again rocked into engagement with the thread the rotary slide valve 40 is returned into the position in Fig. 5, and the pressure agent below the piston 38 is exhausted through the passage 44 and the recess 45 towards the outside.

When exchanging the pirn, the winding spindle 1 is stopped by a device which operates independently of the feeler 25. The winding spindle 1 is again started by the same means. Upon the removal of the wound pirns the yarn proceeding from the supply bobbin is for a moment without tension and, as illustrated in Fig. 3, the feeler 25 might respond to the pull of the spring 40a acting thereon and feel into the rear position. The port 42 of the slide valve 40 would then be opposite the passage 44 and pressure agent would flow below the piston 38, lifting the latter and causing the spindle to be braked. In this case, if the drive for the winding spindles is adapted to be started by the pirn exchanging means, the spindles would not be able to re-start, as they would be firmly held by the brake. To avoid this there is also provided according to Fig. 3 a catch 52, which can be pivoted at 53 into a position within range of the feeler 25 and prevents the latter during the substitution of the pirns from falling backwards, holding the feeler in a position (Fig. 5) in which the interior of the cylinder communicates with the recess 45 in the rotary slide valve 40. The catch 52 is preferably actuated by the pirn substituting means, so that it returns automatically into the broken-line position when the pirn supply member again moves away from the spindles.

From the foregoing description it is thought to be obvious that a winding frame constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. In a winding frame the combination comprising a winding spindle, means for driving the said spindle, a disc clutch included in the said driving means, a second disc clutch for braking the said spindle, a shiftable member positioned between the said second clutch and the said first clutch, movement of the said shiftable member releasing one of the clutches and making the other effective, a pendulating yarn feeler within the path of the yarn, and an operative connection between the said yarn feeler and shiftable member common to the said two clutches, said connection being so constructed and arranged to provide means whereby the movement of the said shiftable member is controlled by the said yarn feeler, said means including an element adapted to be moved by a pressure agent and a rotary slide valve, the said slide valve being operatively connected to the said pendulating yarn feeler so that said feeler controls the action of the pressure agent on the said element.

2. In a winding frame the combination comprising a winding spindle adapted to carry a pirn on which the yarn is wound as the spindle is rotated, a driving means for said spindle including a clutch, a clutch for braking said spindle, a movable clutch member by which said clutches may be thrown on or off, respectively, dependent upon the position of said clutch member, a pendulating feeler engaged by the yarn in its passage to said pirn and movable by change in the tension of the yarn, means for yieldingly controlling said feeler whereby the yarn will be tensioned thereby, and mechanism constructed and arranged to provide means whereby said feeler will assist in the positioning of said shiftable member depending upon the tension of the yarn, said mechanism including a pressure chamber with passage leading thereto, a piston connected to said shiftable member and displaceable through the introduction of a pressure agent through said passage into said chamber, a rotary slide valve through which a pressure agent is introduced operatively connected to said pendulating feeler and turned by movement of said feeler, said rotary valve having a port communicating with said passage dependent upon the extent of movement of said pendulating feeler.

3. In a winding frame the combination comprising a winding spindle adapted to carry a pirn on which the yarn is wound as the spindle is rotated, a driving means for said spindle including a clutch, a clutch for braking said spindle, a movable clutch member by which said clutches may be thrown on or off, respectively, dependent upon the position of said clutch member, a pendulating feeler engaged by the yarn in its passage to said pirn and movable by change in the tension of the yarn, means for yieldingly controlling said feeler whereby the yarn will be tensioned thereby, and mechanism constructed and arranged to provide means whereby said feeler will assist in the positioning of said shiftable member depending upon the tension of the yarn, said mechanism including a pressure chamber with passage leading thereto, a piston connected to said shiftable member and displaceable through the introduction of a pressure agent through said passage into said chamber, a rotary slide valve through which a pressure agent is introduced operatively connected to said pendulating feeler and turned by movement of said feeler, said rotary valve having a port having a graduated entry to said passage dependent upon the turned position of said pendulating feeler.

4. In a winding frame the combination comprising a winding spindle adapted to carry a pirn on which the yarn is wound as the spindle is rotated, a driving means for said spindle including a clutch, a clutch for braking said spindle, a movable clutch member by which said clutches may be thrown on or off, respectively, dependent upon the position of said clutch member, a pendulating feeler engaged by the yarn in its passage to said pirn and movable by change in the tension of the yarn, means for yieldingly controlling said feeler whereby the yarn will be tensioned thereby, and mechanism constructed and arranged to provide means whereby said feeler will assist in the positioning of said shiftable member depending upon the tension of the yarn, said mechanism including a pressure chamber with separate passages leading thereto, a piston connected to said shiftable member and displaceable through the introduction of a pressure agent through one or the other of said passages into said chamber, a rotary slide valve through which a pressure agent is introduced operatively connected to said pendulating feeler and turned by movement of said feeler, said rotary valve having a port communicating with one or the other of said passages dependent upon the turned position of said feeler in one or the other of opposite directions from a determinate position.

5. In a winding frame the combination comprising a winding spindle adapted to carry a pirn on which the yarn is wound as the spindle is rotated, a driving means for said spindle including a clutch, a clutch for braking said spindle, a movable clutch member by which said clutches may be thrown on or off, respectively, dependent upon the position of said clutch member, a pendulating feeler engaged by the yarn in its passage to said pirn and movable by change in the tension of the yarn, means for yieldingly controlling said feeler whereby the yarn will be tensioned thereby, and mechanism constructed and arranged to provide means whereby said feeler will assist in the positioning of said shiftable member depending upon the tension of the yarn, said mechanism including a pressure chamber with separate passages leading thereto, a piston connected to said shiftable member and displaceable through the introduction of a pressure agent through one or the other of said passages into said chamber, a rotary slide valve through which a pressure agent is introduced operatively connected to said pendulating feeler and turned by movement of said feeler, said rotary valve having a port communicating with one or the other of said passages dependent upon the turned position of said feeler in one or the other of opposite directions from a determinate position, said rotary valve having also a recess communicating with the atmosphere and with one of said passages leading to said pressure chamber when said pendulating feeler is occupying its said determinate position and the port in said rotary valve is out of communication with said passages.

6. In a winding frame the combination comprising a winding spindle, means for driving the said spindle, a disc clutch included in the said driving means, a second disc clutch for braking the said spindle, a shiftable member positioned between the said second clutch and the said first clutch, movement of the said shiftable member releasing one of the clutches and making the other effective, a pendulating yarn feeler within the path of the yarn, means for yieldingly controlling said feeler whereby the yarn will be tensioned thereby, and an operative connection between the said yarn feeler and said shiftable member common to the said two clutches, said connection being so constructed and arranged to provide means whereby the movement of the said shiftable member is controlled by the said yarn feeler, said last-named means including an element adapted to be moved by a pressure agent and a rotary slide valve, the said slide valve being operatively connected to the said pendulating yarn feeler so that said feeler controls the action of the pressure agent on the said element.

HANS TRECKMANN.
CARL-GEORG ROSENKRANZ.